US011202175B2

(12) United States Patent
Demizu et al.

(10) Patent No.: US 11,202,175 B2
(45) Date of Patent: Dec. 14, 2021

(54) AT-HOME PREDICTION DEVICE (71) Applicant: NTT DOCOMO, INC., Chiyoda-ku (JP)

(72) Inventors: Tsukasa Demizu, Chiyoda-ku (JP); Haruka Kikuchi, Chiyoda-ku (JP); Yusuke Fukazawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 16/975,507

(22) PCT Filed: Feb. 15, 2019

(86) PCT No.: PCT/JP2019/005662
§ 371 (c)(1),
(2) Date: Aug. 25, 2020

(87) PCT Pub. No.: WO2019/167684
PCT Pub. Date: Sep. 6, 2019

(65) Prior Publication Data
US 2021/0037343 A1 Feb. 4, 2021

(30) Foreign Application Priority Data

Feb. 27, 2018 (JP) .............................. JP2018-033398

(51) Int. Cl.
*H04W 4/02* (2018.01)
*H04W 4/029* (2018.01)
(Continued)

(52) U.S. Cl.
CPC ............ *H04W 4/029* (2018.02); *G06N 20/00* (2019.01); *H04W 4/021* (2013.01)

(58) Field of Classification Search
CPC ....... H04W 4/029; H04W 4/021; G06N 20/00
See application file for complete search history.

(56) References Cited

U.S. PATENT DOCUMENTS

2016/0328661 A1   11/2016   Reese et al.

FOREIGN PATENT DOCUMENTS

JP     2015-122055 A     7/2015
JP     2017-219975 A     12/2017

OTHER PUBLICATIONS

International Preliminary Report on Patentability and Written Opinion dated Sep. 3, 2020 in PCT/JP2019/005662 (submitting English translation only), 7 pages.

(Continued)

*Primary Examiner* — Curtis B Odom
(74) *Attorney, Agent, or Firm* — Oblon, McClelland, Maier & Neustadt, L.L.P.

(57) ABSTRACT

The at-home prediction device is a device that makes a prediction relating to a resident in a household being at home, and the at-home prediction device includes: a household information acquiring unit configured to acquire household information according to the number of households of each type in an area in which the household are located; a prediction information acquiring unit configured to acquire prediction information of a plurality of types other than the household information in the area that is used for the prediction; a dimension compressing unit configured to perform dimension compression on the prediction information together with the household information for each type of the prediction information; a prediction unit configured to make a prediction relating to the resident in the household being at home on the basis of information that is compressed in dimensions; and an output unit configured to output information representing a prediction result.

5 Claims, 7 Drawing Sheets

(51) Int. Cl.
*G06N 20/00* (2019.01)
*H04W 4/021* (2018.01)

(56) References Cited

OTHER PUBLICATIONS

International Search Report dated May 7, 2019 in PCT/JP2019/005662 filed Feb. 15, 2019, 2 pages.

| | MALE SOLITARY RESIDENT | FEMALE SOLITARY RESIDENT | ONLY MARRIED COUPLE | MARRIED COUPLE WITH CHILD | TWO HOUSEHOLDS | ... |
|---|---|---|---|---|---|---|
| MESH CELL 1 | XX% | XX% | XX% | XX% | XX% | ... |
| MESH CELL 2 | XX% | XX% | XX% | XX% | XX% | ... |
| ... | ... | ... | ... | ... | ... | ... |

Fig. 3

| | 20'S MALE | 20'S FEMALE | ... | 60'S MALE | 60'S FEMALE | ... |
|---|---|---|---|---|---|---|
| MESH CELL 1 | XX% | XX% | ... | XX% | XX% | ... |
| MESH CELL 2 | XX% | XX% | ... | XX% | XX% | ... |
| ... | ... | ... | ... | ... | ... | ... |

AT-HOME PREDICTION DEVICE

TECHNICAL FIELD

The present invention relates to an at-home prediction device making a prediction relating to a resident in a household being at home.

BACKGROUND ART

Conventionally, in order to efficiently perform delivery of packages and the like, technologies for estimating whether or not a resident will be at home in a house have been proposed. For example, in Patent Literature 1, it has been described to calculate a being at home probability according to a time on the basis of operating times of devices installed in a house.

CITATION LIST

Patent Literature

[Patent Literature 1] Japanese Unexamined Patent Publication No. 2015-122055

SUMMARY OF INVENTION

Technical Problem

In the method disclosed in Patent Literature 1, while it is necessary to obtain operating times of devices installed in a house, it may not necessarily be easy to obtain such information. Thus, it is conceivable to make a prediction of being at home in a household by using information for each area in which a household that is a prediction target is present. For example, it is conceivable to make a prediction of presence/absence by using an in-area state of a mobile communication terminal or a TV audience rating in each area.

However, in a case in which the information described above is used alone, a prediction including a bias depending on tendencies of users of a specific service is made, and the accuracy of the prediction may be low. In contrast to this, it is conceivable to make a prediction about being at home by combining such information. However, by simply combining data of a plurality of kinds, high-dimensional and sparse data is obtained, and there is concern that the accuracy of prediction will deteriorate.

One embodiment of the present invention has been made in view of the situations described above, and an object thereof is to provide an at-home prediction device capable of making a prediction relating to a resident in a household being at home with a high accuracy.

Solution to Problem

In order to achieve the object described above, according to one embodiment of the present invention, there is provided an at-home prediction device that makes a prediction relating a resident in a household being at home, the at-home prediction device including: a household information acquiring unit configured to acquire household information according to the number of households of each type in an area in which the household is located; a prediction information acquiring unit configured to acquire prediction information of a plurality of types other than the household information in the area that is used for the prediction relating to being at home; a dimension compressing unit configured to perform dimension compression on the prediction information acquired by the prediction information acquiring unit together with the household information acquired by the household information acquiring unit for each type of the prediction information; a prediction unit configured to make a prediction relating to the resident in the household being at home on the basis of information that is compressed in dimensions by the dimension compressing unit; and an output unit configured to output information representing a prediction result acquired by the prediction unit.

In the at-home prediction device according to one embodiment of the present invention, a prediction relating to the resident in the household being at home is made on the basis of information that is acquired by performing dimension compression of each piece of prediction information together with the household information. Since prediction information of a plurality of types is used, a bias for a prediction of each piece of prediction information can be reduced. In addition, since dimension compression of information is performed, information used for a prediction can be configured as dense data. Since each piece of prediction information is compressed in dimensions together with household information, pieces of prediction information influencing each other at the time of dimension compression can be avoided, and accordingly, each piece of prediction information can be appropriately taken into account at the time of making a prediction relating to a resident being at home. In accordance with these, according to an at-home prediction device of one embodiment of the present invention, a prediction relating to a resident in a household being at home can be made with a high accuracy.

Advantageous Effects of Invention

According to one embodiment of the present invention, a bias of prediction information with respect to a prediction can be reduced. In addition, information used for a prediction can be formed to be dense data. Furthermore, mutual influences of pieces of prediction information at the time of compressing a dimension can be avoided, and prediction information can be appropriately taken into account at the time of a prediction relating to a resident being at home. In accordance with these, according to one embodiment of the present invention, a prediction relating to a resident in a household being at home can be made with a high accuracy.

DESCRIPTION OF EMBODIMENTS

Hereinafter, an at-home prediction device according to an embodiment of the present invention will be described in detail with reference to the drawings. In description of the drawings, the same reference signs will be assigned to the same elements, and duplicate description will be omitted.

Figure 1:
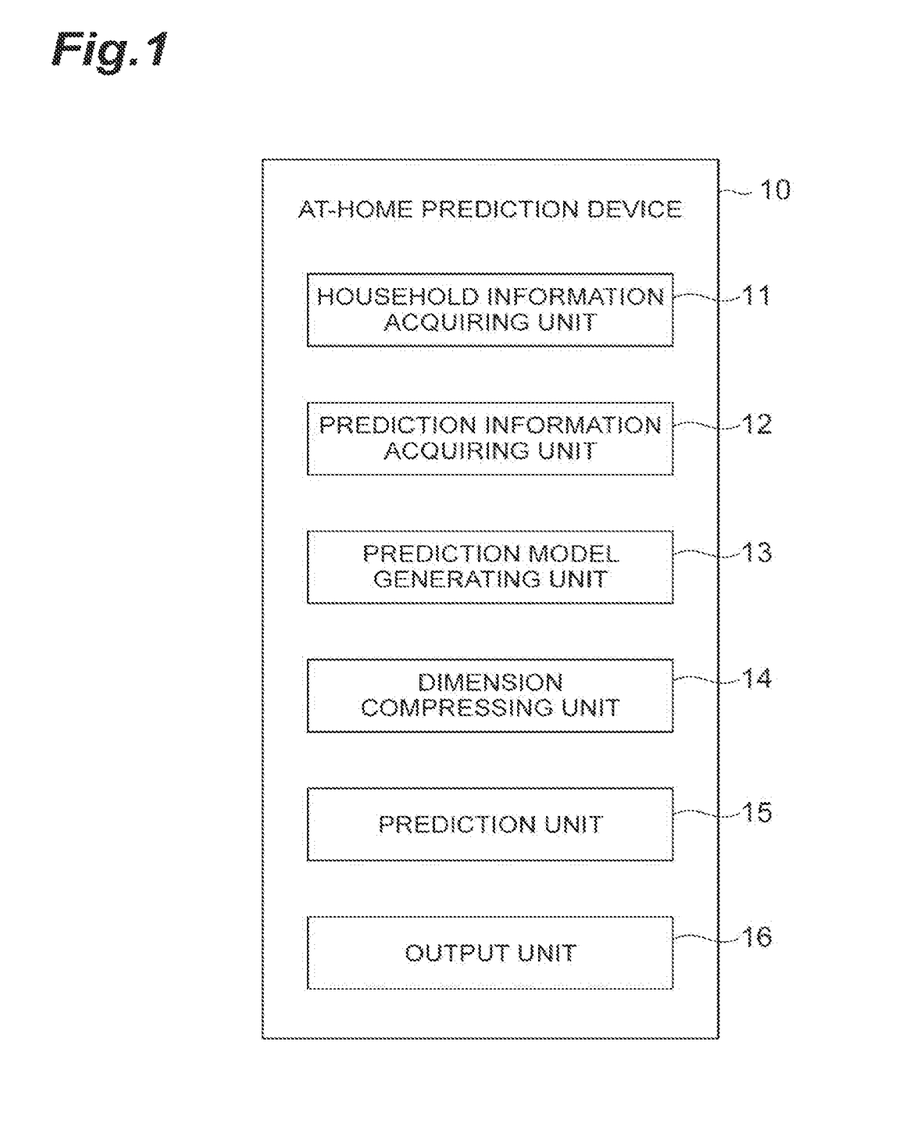
FIG. 1 is a diagram illustrating the configuration of an at-home prediction device according to an embodiment of the present invention.

FIG. 1 illustrates an at-home prediction device 10 according to this embodiment. The at-home prediction device 10 is a device (system) that makes a prediction relating to a resident in a household being at home. The at-home prediction device 10 makes a prediction using information relating to a geographical area in which the household are located. The geographical area is set in advance. For example, each of mesh cells (for example, standard region mesh cells) acquired by partitioning a region that is a prediction target into rectangles having one side of about several hundreds of meters may be set as the area described above. In the following description, the area will be described as a mesh cell. Here, the area does not necessarily need to be a mesh cell.

A prediction using the at-home prediction device 10, for example, may be a prediction about whether or not a resident is being at home in a specific household in accordance with a time (a time period, a day of the week, or the like). Alternatively, a degree of a being at home proportion of (all the) households in a specific mesh cell may be predicted in accordance with a time (a time period). Furthermore, (a trend of) a being at home proportion of (all the) households in a specific mesh cell may be predicted without limiting a time (for example, during the day). In addition, a prediction may be made for households of a specific family type rather than for all the households in a mesh cell. A target other than those described above may be set, as long as a resident in a household being at home is predicted.

A prediction result, for example, is used for determining a time for delivery. Alternatively, the prediction result is used as marketing data (for example, data for improving cost efficiency in spot commercial running for a specific family type as a target) relating to activities at the time of being at home such as watching TV and the like. However, the prediction result may be used for other than those described above.

Subsequently, the function of the at-home prediction device 10 according to this embodiment will be described. As illustrated in FIG. 1, the at-home prediction device 10 is configured to include a household information acquiring unit 11, a prediction information acquiring unit 12, a prediction model generating unit 13, a dimension compressing unit 14, a prediction unit 15, and an output unit 16.

Figure 2:
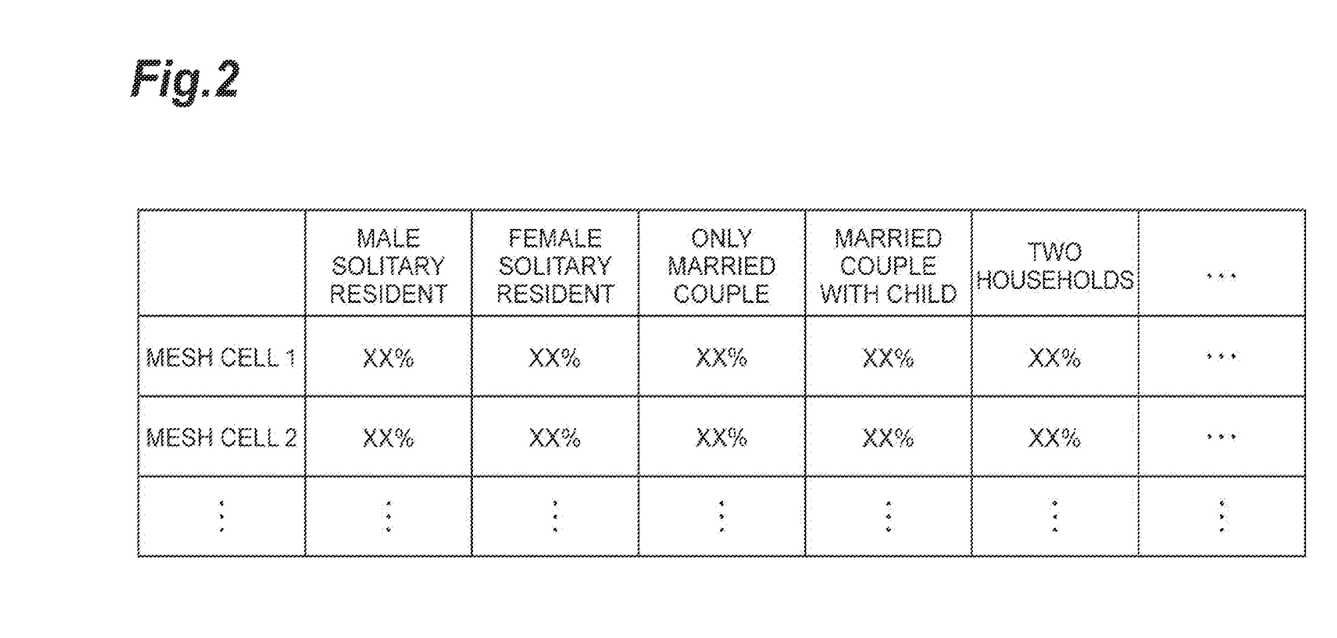
FIG. 2 is a diagram illustrating an example of household information.

The household information acquiring unit 11 is a functional unit that acquires household information according to the number of households of each type in a mesh cell in which a household is located. FIG. 2 illustrates an example of household information acquired by the household information acquiring unit 11. Types of household, for example, are composition types (lifestyle classifications) of residents of households and, more specifically, as illustrated in FIG. 2, are types such as "a male solitary resident", "a female solitary resident", "a married couple only", "a married couple with a child", and "two households". The household information, for example, is a proportion (for example, a percentile value) of numbers of households of each type for each mesh cell. The types of household are not limited to the types described above and may be any types as long as the types characterize the households. The household information may be information corresponding to the number of households of each type and may be the number of households instead of a proportion (information of a proportion to be described below may be information of numbers in accordance with the information).

The household information, for example, may be prepared on the basis of information of demographic statistics for each mesh cell by a manager of the at-home prediction device 10 in advance and be input to the at-home prediction device 10. The household information acquiring unit 11 acquires input household information. The household information acquiring unit 11 outputs the acquired household information to the dimension compressing unit 14. The acquisition of household information may be performed using a method other than the method described above. In FIG. 2, although information for a plurality of mesh cells is illustrated, the household information acquiring unit 11 may acquire only household information relating to a mesh cell that is a prediction target.

The prediction information acquiring unit 12 is a functional unit that acquires prediction information of a plurality of types other than household information in a mesh cell that is used for a prediction relating to being at home. The prediction information acquiring unit 12 may acquire information of any one of in-area states of mobile communication terminals held by residents of a mesh cell that is a prediction target, a watching or listening state of broadcast in the mesh cell, population compositions for each gender, each age, or each income in the mesh cell, facilities in the mesh cell, and geographical characteristics of the mesh cell as prediction information.

Figure 3:
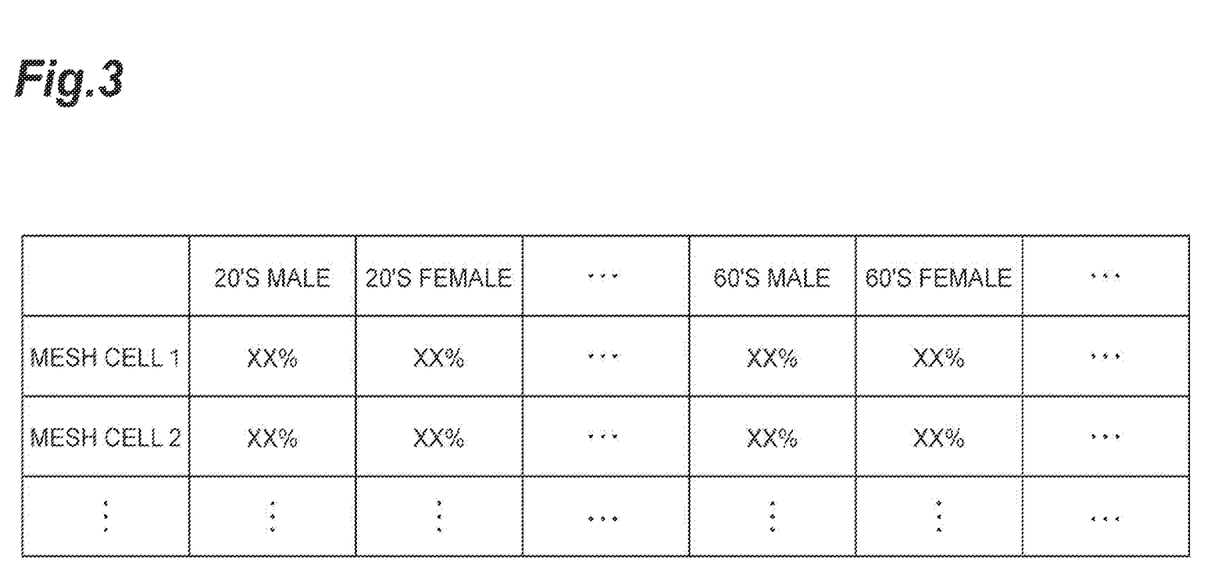
FIG. 3 is a diagram illustrating one example of prediction information.

An example of information representing in-area states of mobile communication terminals held by residents in mesh cells, which is one piece of prediction information, is illustrated in FIG. 3. The information representing the in-area states, for example, is a proportion (for example, a percentile value) of the number of mobile communication terminals (mobile communication terminals performing wireless communication with a base station) under a base station (a mobile phone base station) located in a mesh cell to mobile communication terminals held by residents of the mesh cell. The proportion is a proportion of residents of a mesh cell present in the mesh cell, in other words, a proportion of residents (having a high likelihood of) being at home. In addition, as illustrated in FIG. 3, the proportion may be a value for each age and each gender. Furthermore, the proportion may be a value for each time (each time period) (for example, for every one hour), and information of a time of a prediction target is acquired as prediction information. In addition, the information may be information of a time of a prediction target or may be past information of the same time (8 o'clock, 9 o'clock, or the like) during one day (for information corresponding to a time, this is the same in the following description).

In FIG. 3, although information for a plurality of mesh cells is illustrated, the prediction information acquiring unit 12 may acquire prediction information relating to a mesh cell that is a prediction target and a time (time period).

The information representing a watching or listening state of broadcast in the mesh cell, which is one piece of prediction information, is a TV rating in households of the mesh cell. The TV rating is a proportion (for example, a percentile value) of the number of households in which watching TV is being performed in the mesh cell. The proportion is a proportion of residents of households being at home, in other words, a proportion of residents (having a high likelihood of) being at home. The proportion, similar to the household information illustrated in FIG. 2, may be a value for each type of household. In addition, the proportion may be a value for each time (each time period) (for example, for every one hour). Furthermore, the information described above may be a proportion of the number of households in which a broadcast other than television, for example, a radio broadcast is being listened to. As described above, the prediction information may be on the basis of a domain log (a TV rating in the example described above) that is information for each of various services (in the example described above, a TV broadcast service).

The information representing population compositions for each gender and for each age in the mesh cell, which is one piece of the prediction information, for example, is a proportion (for example, a percentile value) of the number of residents in the mesh cell for each gender and for each age. The age may be in steps of one year, five years, ten years, or the like. In addition, the information described above may be population compositions for each age or each gender in each mesh cell.

The information representing population compositions for each income in the mesh cell, which is one piece of the prediction information, for example, is a proportion (for example, a percentile value) of the number of residents in the mesh cell for each annual income. The annual income may be in steps of one million yen.

The information representing facilities in the mesh cell, which is one piece of the prediction information, for example, is the number of points of interest (POIs) for each category included in the mesh cell. For example, the information may be the number of convenience stores, hospitals, and the like. The information representing geographical characteristics of the mesh cell, which is one piece of the prediction information, for example, may be a numerical value (a value of a continuous quantity) representing characteristics of the mesh cell. For example, the information may be a distance from a station near to the mesh cell (for example, in units of km) and an average value of land of the mesh cell (for example, in units of 10,000 yen/tsubo) or the like.

The prediction information acquiring unit 12, for example, acquires the prediction information described above from a database that is managed in an individual domain. Alternatively, the prediction information, for example, may be prepared in advance by a manager of the at-home prediction device 10 on the basis of statistical information for each mesh cell, information measured for each mesh cell, or the like and be input to the at-home prediction device 10. The prediction information acquiring unit 12 acquires prediction information that has been input. The prediction information acquiring unit 12 outputs the acquired prediction information to the dimension compressing unit 14.

The acquisition of prediction information may be performed using a method other than the methods described above. In addition, as the prediction information, all the information described above does not need to be acquired, and information of at least two types may be acquired. Furthermore, the prediction information may be any information as long as the information is information other than the household information for the mesh cell that is used for a prediction relating to being at home.

The household information acquired by the household information acquiring unit 11 and the prediction information acquired by the prediction information acquiring unit 12 are used for a prediction relating to the resident being at home using the prediction unit 15.

The prediction model generating unit 13 is a functional unit that generates a prediction model (a classification model, a classifier) used for a prediction using the prediction unit 15. The prediction model generating unit 13 acquires machine learning information (teacher data and correct answer data) corresponding to the household information and the prediction information, performs dimension compression of the acquired machine learning information corresponding to the prediction information for each type together with the machine learning information corresponding to the household information using a method set in advance, and generates a rule of the dimension compression. The prediction model generating unit 13 performs machine learning (supervised learning) on the basis of a dense vector (dense data) that is dimension-compressed machine learning information, thereby generating a prediction model (learned model). More specifically, the prediction model generating unit 13 generates a prediction model as below.

The prediction model generated by the prediction model generating unit 13, for example, includes a neural network. An output of the neural network corresponds to a prediction result acquired by the at-home prediction device 10.

The prediction model generating unit 13 acquires machine learning information corresponding to household information and prediction information. Similar to the acquisition of household information using the household information acquiring unit 11 and acquisition of prediction information using the prediction information acquiring unit 12, the prediction model generating unit 13 acquires machine learning information. The machine learning information acquired by the prediction model generating unit 13 is similar to the household information acquired by the household information acquiring unit 11 and the prediction information acquired by the prediction information acquiring unit 12 in the format. In order to appropriately perform machine learning, the machine learning information acquired by the prediction model generating unit 13, as illustrated in FIGS. 2 and 3, may relate to a plurality of mesh cells and a plurality of times (for information associated with a time).

Figure 4:
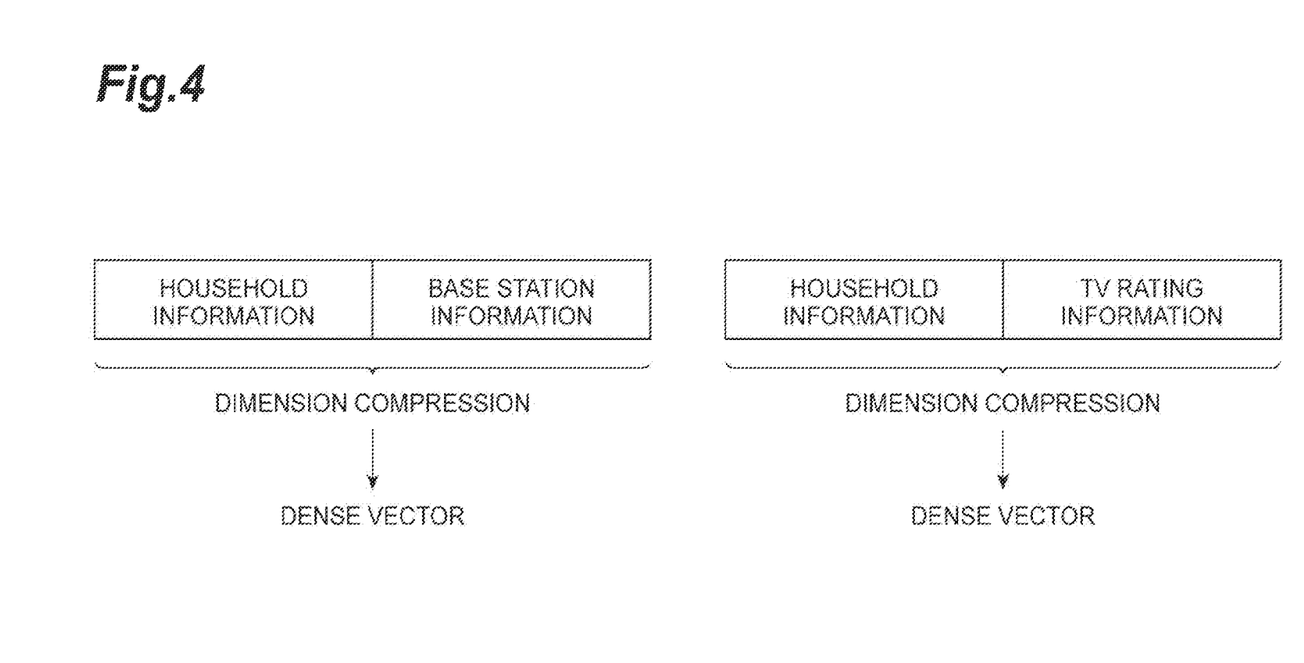
FIG. 4 is a diagram schematically illustrating dimension compression.

The prediction model generating unit 13 performs dimension compression of machine learning information corresponding to the prediction information together with machine learning information corresponding to the household information for each type, thereby generating a dense vector. For example, as illustrated in FIG. 4, the machine learning information corresponding to the household information and the machine learning information corresponding to the prediction information relating to the base station (the mobile communication terminal) described above are combined, and the machine learning information corresponding to the household information and the machine learning information corresponding to the prediction information relating to the TV rating described above are combined. Information of the same mesh cell and the same time (for information associated with a time) are combined. In other words, the household information illustrated in FIG. 2 and the prediction information illustrated in FIG. 3 are information that is combined for each mesh cell. In a case in which information not associated with a time and information associated with a time are combined, information not associated with time is combined with information associated with a time. The information that is combined is numerical value data of a plurality of dimensions (dimensions in leftward/rightward directions in FIGS. 2 and 3).

The prediction model generating unit 13 converts respective combined information into a dense vector by performing dimension compression. The dimension compression is performed such that dimensions of a type of household for the household information (for example, a dimension of the household information illustrated in FIG. 2 in a horizontal direction) are compressed. In other words, the compressed information is information for the same mesh cell and for each time (for information associated with a time).

Figure 5:
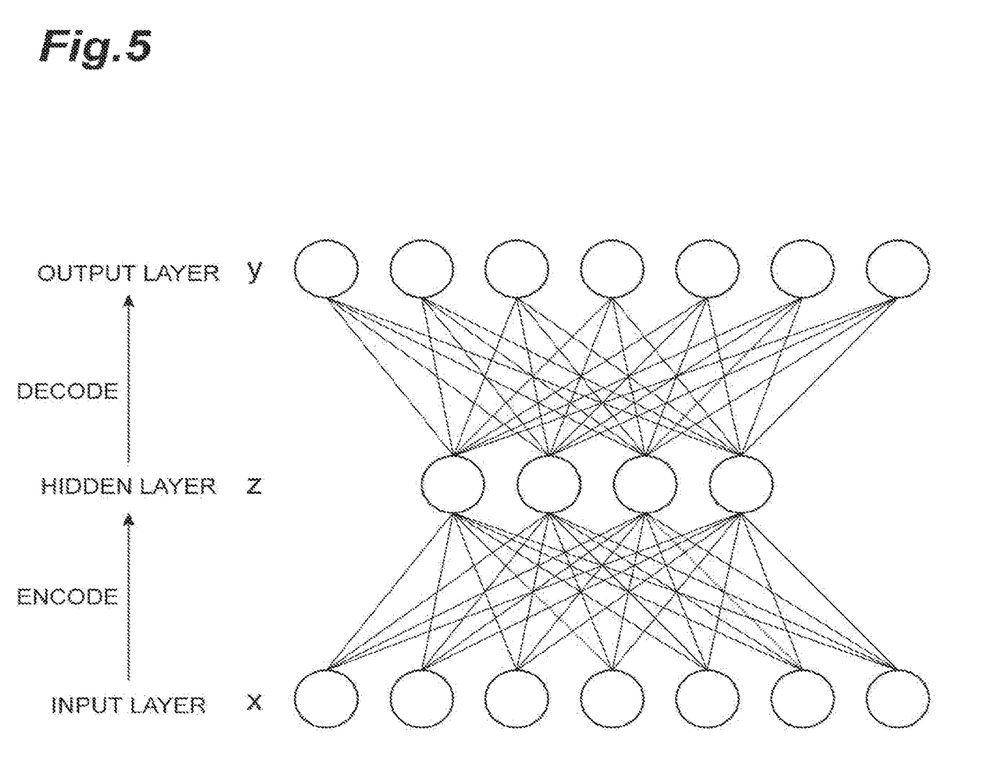
FIG. 5 is a diagram schematically illustrating a neural network used for dimension compression.

The dimension compression may be performed using a conventional technology. For example, the prediction model generating unit 13 performs dimension compression by performing unsupervised learning. More specifically, in a case in which an auto-encoder (more specifically, a stacked auto-encoder) of unsupervised learning is used, for a neural network illustrated in FIG. 5, by acquiring the following s, W, W', b, and b' using a vector x of information before dimension compression, a vector y of information after dimension compression is acquired.

$$z = s(Wx+b) \quad \text{encode:}$$

$$y = s(W'z+b') \quad \text{decode:}$$

The numbers of nodes of the output layer and the output layer are the number of dimensions of a vector x of information before dimension compression and a vector y of information after the dimension compression respectively. The values of dimensions of the vectors x and y correspond to values of the nodes of the output layer and the output layer. The numbers of nodes of a hidden layer (intermediate layer) and an output layer (the numbers of dimensions of vectors z and y) are set in advance. Here, the number of nodes of the output layer (the number of dimensions of the vector y of information after dimension compression) is smaller than the number of nodes of the input layer (the vector x of information before dimension compression). When the number of nodes of the input layer (the vector x of the information before dimension compression) is in the range of several hundreds to several thousands, for example, the number of the nodes of the output layer (the number of dimensions of the vector y of information after the dimension compression) is set to about 100 or less. Parameters such as the number of the nodes of the output layer (the number of dimensions of the vector y of information after dimension compression) and the like may be adjusted through tuning.

The auto-encoder generated as described above is a rule of dimension compression that indicates how the dimension compression is performed. The prediction model generating unit 13 generates a rule of dimension compression for each type of combination of information and performs dimension compression for information using a rule of similar dimension compression (for example, using the auto-encoder). The prediction model generating unit 13 outputs information representing the rule of dimension compression that has been generated to the dimension compressing unit 14.

The dimension compression may be performed using a method other than the auto-encoder. For example, the dimension compression may be performed using principal component analysis or non-negative matrix factorization (NMF).

The dimension compressed information (a dense vector) corresponds to an input of a neural network used for a prediction using the prediction unit 15. In other words, the information is used as an input value at the time of generating a prediction model using machine learning.

In addition, the prediction model generating unit 13 acquires information representing a being at home state of a resident in a household in a mesh cell and a time relating to the machine learning information. The information corresponds to a prediction result acquired by the at-home prediction device 10, in other words, an output of a neural network used for a prediction using the prediction unit 15.

For example, in a case in which the at-home prediction device 10 predicts whether or not a resident is being at home in a specific household in accordance with a time (a time period), the information is information that indicates presence/absence of a resident being at home for each household and each time. More specifically, the information is information that is "1" when a resident is being at home and is "0" when a resident is not being at home. Alternatively, in a case in which the at-home prediction device 10 predicts a degree of a being at home proportion of (all the) households in a mesh cell, the information is information that represents a being at home proportion of households for each mesh cell and each time.

The prediction model generating unit 13 performs machine learning by setting dimension compressed information (a dense vector) as an input value input to the neural network and setting information representing a being at home state of a resident as an output value from the neural network, thereby generating a neural network used for a prediction using the prediction unit 15. All the information of a combination of a plurality of types that has been compressed in dimensions is set as an input value input to a (one) neural network. Neurons corresponding to a sum of the numbers of dimensions of dimension-compressed information are disposed in the input layer of the neural network. In the output layer of the neural network, neurons corresponding to the number (for example, one) corresponding to the information representing a being at home state of a resident are disposed.

When the values are set as an input value and an output value for the neural network, the input value and the output value can be configured to be in correspondence with each other. In other words, information for the same mesh cell and the same time (in a case in which information associated with a time is included) is formed. In addition, in a case in which information associated with a time is included, information not associated with a time is combined with the information associated with a time. The machine learning described above, in other words, the generation of a neural network can be performed similar to a conventional case. More specifically, a neural network is generated by calculating weighting factors of the neural network on the basis of the dimension-compressed machine learning information and the information representing a being at home state of a resident.

The prediction model generating unit 13 outputs a prediction model including the generated neural network to the prediction unit 15. The generation of a neural network and the output of a prediction model to the prediction unit 15 are performed in advance up to a time point at which a prediction is made.

In the description presented above, although the input value input to the neural network is only a value for each mesh cell, information of individual households located in a mesh cell may be set as an input value input to the neural network. In such a case, a neuron corresponding to the input value is disposed in the input layer of the neural network. Particularly, in a case in which a prediction about whether a resident is being at home in a specific household is made, information of an individual household may be set as an input value. For example, a being at home proportion at the time of visit in the past in a household may be set as an input value. This being at home proportion may be a value for each time (past information at the same time during one day as a time that is a prediction target). The information of an individual household may not be compressed in dimensions described above.

In addition, before dimension compression is performed, the prediction model generating unit 13 may perform standardization of machine learning information corresponding to the household information and machine learning information corresponding to the prediction information. There are cases in which the machine learning information corresponding to the household information and the machine learning information corresponding to the prediction information are not uniform in units and cannot be compared with each other depending on used information (the number of cases and a distance or the like). Thus, before dimension compression, a bias between information (data) may be eliminated by uniformizing the units by performing standardization for each type of information. For example, a value x' converted from a value x of each information is calculated using the following equation using an average μ and a standard deviation σ of the type of each information, and dimension compression is performed using the converted value x'.

$$x'=(x-\mu)/\sigma$$

In a case in which the standardization described above is performed, also when a prediction is made, similar standardization is performed for the household information and the prediction information.

The dimension compressing unit 14 is a functional unit that performs dimension compression on the prediction information acquired by the prediction information acquiring unit 12 together with the household information acquired by the household information acquiring unit 11 for each type of the prediction information. The dimension compressing unit 14 performs dimension compression on the basis of the rule of the dimension compression generated by the prediction model generating unit 13.

The dimension compressing unit 14 inputs information representing the rule of dimension compression from the prediction model generating unit 13, stores the input information, and uses the stored information for the dimension compression. The dimension compressing unit 14 inputs household information from the household information acquiring unit 11 and inputs prediction information from the prediction information acquiring unit 12. The dimension compressing unit 14, for example, as illustrated in FIG. 4, combines the input prediction information with the household information for each type and performs dimension compression, thereby generating a dense vector. The dimension compressing unit 14 outputs the dimension-compressed information (the dense vector) to the prediction unit 15.

The prediction unit 15 is a functional unit that makes a prediction relating to the resident in the household being at home on the basis of the information that has been compressed in dimensions using the dimension compressing unit 14. The prediction unit 15 inputs a prediction model including the generated neural network from the prediction model generating unit 13, stores the prediction model, and uses the stored prediction model for the prediction described above. The neural network inputs a value of the information described above that has been compressed in dimensions and outputs a value representing a prediction result relating to being at home.

The prediction model is assumed to be used as a program module that is a part of artificial intelligence software. The prediction model is used by a computer including a CPU and a memory. More specifically, the CPU of the computer operates to input information to the input layer of the neural network in accordance with an instruction from the prediction model stored in a memory, perform an arithmetic operation based on weighting factors and the like that have been learned in the neural network, and output a result from the output layer of the neural network. This similarly applies also to the neural network (the auto-encoder) that is information representing the rule of dimension compression.

The prediction unit 15 inputs dimension-compressed information (a dense vector) from the dimension compressing unit 14. The prediction unit 15 sets dimension-compressed information (the dense vector) as an input value input to the neural network included in the prediction model and acquires information representing a being at home state of the resident, in other words, information representing a prediction result as an output value from the neural network. The prediction unit 15 outputs information representing the acquired prediction result to the output unit 16.

The prediction unit 15 may acquire information for each of households that are prediction targets and make a prediction relating to residents being at home in the households also on the basis of the information. As presented in the description of the prediction model generating unit 13, for example, being at home in a household at the time of visit in the past may be set as an input value input to the prediction model.

An output value from the neural network is a value corresponding to machine learning and, for example, is a score representing whether or not a resident in a household is being at home. As described above, in a case in which machine learning is performed using information that represents "1" when a resident is being at home and represents "0" when a resident is not being at home, as the value of the information becomes closer to "1", the likelihood of being at home becomes higher, and, as the value becomes closer to "0", the likelihood of not being at home becomes higher. Alternatively, the output value may be a being at home proportion of (all the) households in a mesh cell.

The output unit 16 is a functional unit that outputs information representing a prediction result acquired by the prediction unit 15. The output unit 16 inputs information representing a prediction result from the prediction unit 15. The output unit 16, for example, displays the information in a display device included in the at-home prediction device 10 for output. In accordance with this, the information is used for determining a delivery time and the like by being referred to by a manager or the like of the at-home prediction device 10. Alternatively, the output unit 16 may perform output other than display or may transmit the information to another device, another module, or the like for output. The function of the at-home prediction device 10 according to this embodiment has been described as above.

Figure 6:
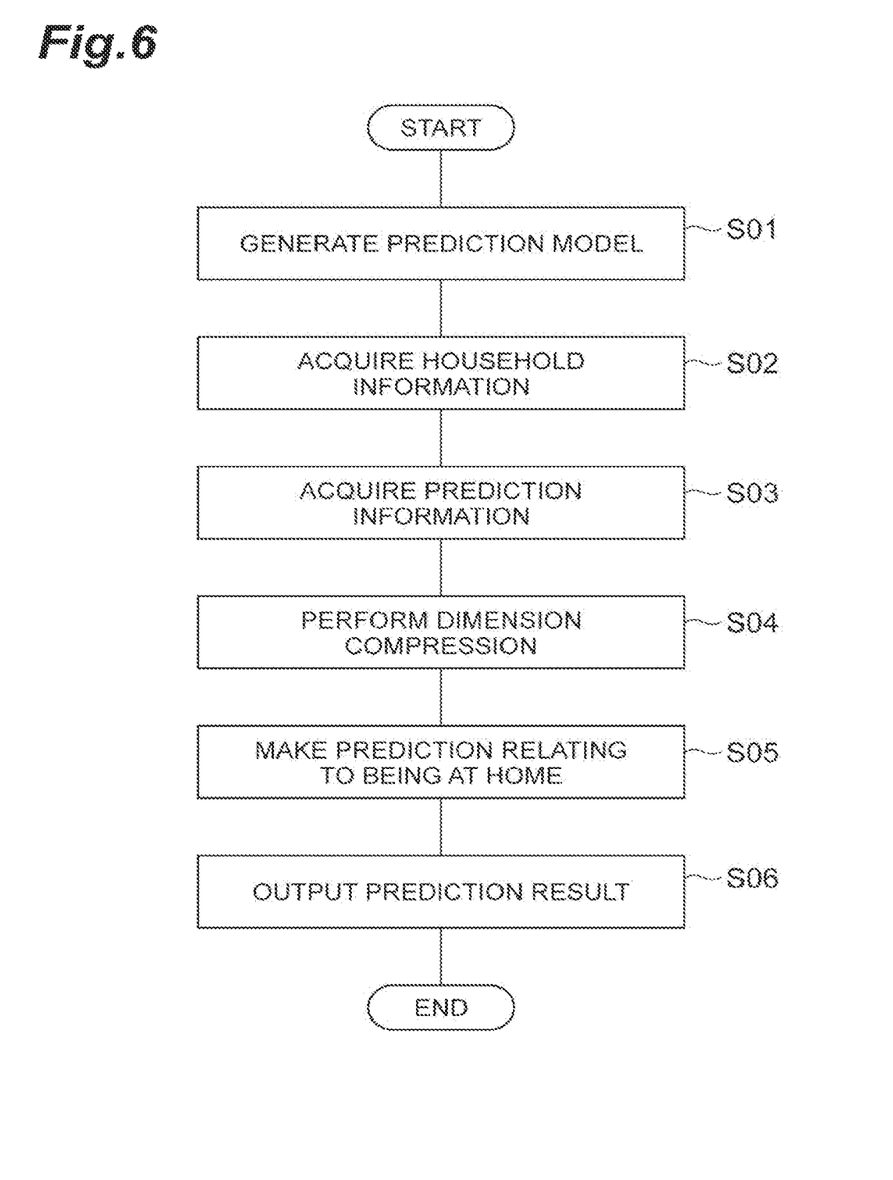
FIG. 6 is a flowchart illustrating a process executed by an at-home prediction device according to an embodiment of the present invention.

Subsequently, a process executed by the at-home prediction device 10 according to this embodiment (an operation method performed by the at-home prediction device 10) will be described with reference to a flowchart illustrated in FIG. 6. In this process, first, by the prediction model generating unit 13, machine learning information is acquired and is compressed in dimensions, and a rule of the dimension compression is generated. In addition, machine learning is performed on the basis of a dense vector that is dimension-compressed machine learning information, whereby a prediction model is generated (S01). The generation of a prediction model does not need to be performed for each prediction. Thus, once a prediction model is generated, the generation may not be performed thereafter.

Subsequently, household information is acquired by the household information acquiring unit 11 (S02). In addition, prediction information of a plurality of types is acquired by the prediction information acquiring unit 12 (S03). Subsequently, the prediction information is compressed in dimensions together with the household information for each type on the basis of the rule of the dimension compression by the dimension compressing unit 14 (S04). Subsequently, a prediction relating to a resident being at home in a household is made by the prediction unit 15 on the basis of the dense vector that is information compressed in dimensions by the dimension compressing unit 14 (S05). The prediction is performed in accordance with an input of the dense vector to the prediction model. Subsequently, information representing a prediction result acquired by the prediction unit 15 is output by the output unit 16 (S06). The process executed by the at-home prediction device 10 according to this embodiment has been described as above.

In this embodiment, a prediction relating to a resident in a household being at home is made on the basis of information acquired by performing dimension compressing each piece of prediction information together with household information. Since prediction information of a plurality of types is used, a bias for a prediction of each piece of prediction information can be reduced. In addition, since dimension compression of information is performed, information used for a prediction can be configured as dense data. For example, when a prediction is to be made by performing machine learning with a plurality of pieces of information described above expressed high dimensionally and sparsely, the following problems occur. An extremely long time is taken for optimization calculation at the time of generating the prediction model. The accuracy of the prediction model deteriorates in accordance with multi-collinearity (variables having a high mutual correlation are applied to the input). As in this embodiment, by performing dimension compression (dropping into a low-dimensional expression), calculation resources are reduced. In addition, in accordance with a dense expression in a low dimension, the number of combinations expressed by such data is reduced, the number of required data samples can be also reduced, and consequently, the prediction accuracy is improved. Furthermore, by performing dropping into a low dimension, there is a qualitative advantage that data can be easily visualized.

If a plurality of pieces of prediction information and household information are compressed together in dimensions, there is concern that the pieces of prediction information influence each other at the time of dimension compression, and a prediction accuracy deteriorates in accordance therewith. As in this embodiment, by performing dimension compression of each piece of prediction information together with household information, pieces of prediction information influencing each other at the time of the dimension compression can be avoided, and accordingly, each piece of prediction information can be appropriately taken into account at the time of making a prediction relating to a resident being at home. In accordance with these, according to this embodiment, a prediction relating to a resident in a household being at home can be made with a high accuracy. In addition, in accordance with improvement of the prediction accuracy, decision making such as determination of a delivery time and the like can be appropriately supported.

Furthermore, household information of a prediction target is acquired, and a prediction not for each mesh cell but for each household may be configured to be made. According to such a prediction, for example, in the case of visiting individual households or the like such as delivery, a more effective prediction can be made.

In addition, as in this embodiment, a rule of dimension compression and a prediction model may be configured to be generated. In such a case, this embodiment can be performed more reliably and appropriately. Here, the generation of a rule of dimension compression and a prediction model does not necessarily need to be performed by the at-home prediction device 10 according to this embodiment and may be performed by a device other than the at-home prediction device 10. In such a case, the at-home prediction device 10 acquires information representing the rule of dimension compression and the prediction model that have been generated in advance.

In addition, the prediction model described above may be a model other than a neural network. For example, a logistic regression model, a decision tree model, or a model using a random forest or a gradient boosting decision tree can be used. The prediction using dimension-compressed information may not be a prediction using the prediction model using machine learning described above but may be performed using any other arbitrary method.

The block diagram used for description of the embodiment described above represents blocks in functional units. Such functional blocks (constituent units) are realized by an arbitrary combination of at least one of hardware and software. In addition, a method that realizes each functional block is not particularly limited. In other words, each functional block may be realized by one device that is combined physically or logically or may be realized by directly or indirectly (for example, in a wired manner or a wireless manner) connecting two or more devices that are separated physically or logically and using the plurality of devices. A functional block may be realized by combining software with one device described above or the plurality of devices described above.

As functions, there are determining, judging, calculating, computing, processing, deriving, investigating, looking up, ascertaining, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, and the like, but the functions are not limited thereto. For example, a functional block (constituent unit) causing transmitting to function is referred to as a transmitting unit or a transmitter. As described above, methods of realizing all the functions are not particularly limited.

Figure 7:
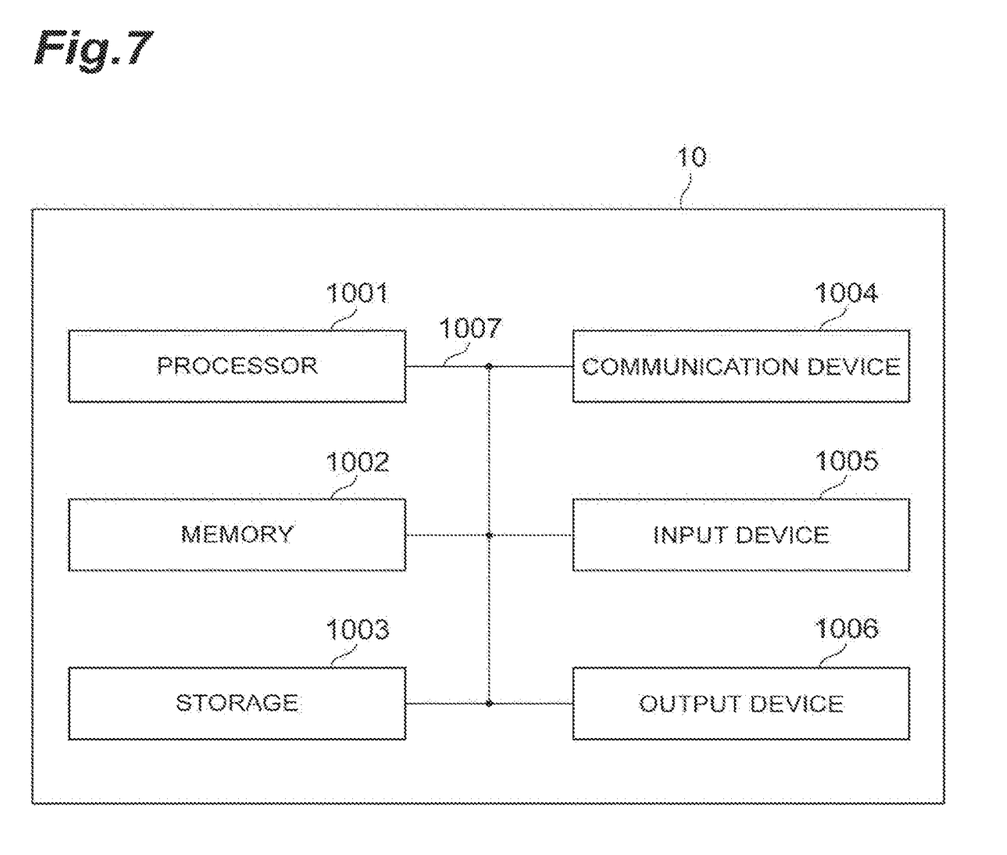
FIG. 7 is a diagram illustrating the hardware configuration of an at-home prediction device according to an embodiment of the present invention.

For example, the at-home prediction device 10 according to one embodiment of the present disclosure may function as a computer that performs the process of the method of the present disclosure. FIG. 7 is a diagram illustrating one example of the hardware configuration of the at-home prediction device 10 according to an embodiment of the present disclosure. The at-home prediction device 10 described above, physically, may be configured as a computer device including a processor 1001, a memory 1002, a storage 1003, a communication device 1004, an input device 1005, an output device 1006, a bus 1007, and the like.

In addition, in the following description, a term "device" may be rephrased with a circuit, a device, a unit, or the like. The hardware configuration of the at-home prediction device 10 may be configured to include one or a plurality of devices illustrated in the drawing and may be configured without including some devices.

Each function of the at-home prediction device 10 is realized as the processor 1001 performs an arithmetic operation by causing predetermined software (a program) to be read onto hardware such as the processor 1001, the memory 1002, and the like, controls communication using the communication device 1004, and controls at least one of data reading and data writing for the memory 1002 and the storage 1003.

The processor 1001, for example, controls the entire computer by operating an operating system. The processor 1001 may be configured by a central processing unit (CPU) including an interface with peripheral devices, a control device, an arithmetic operation device, a register, and the like. For example, each function of the at-home prediction device 10 may be realized by the processor 1001.

In addition, the processor 1001 reads a program (a program code), a software module, data, and the like from at least one of the storage 1003 and the communication device 1004 into the memory 1002 and executes various processes in accordance with these. As the program, a program causing a computer to execute at least some of the operations described in the embodiment described above is used. For example, each function of the at-home prediction device 10 may be realized by a control program that is stored in the memory 1002 and operated by the processor 1001. Although the various processes described above have been described to be executed by one processor 1001, the processes may be executed simultaneously or sequentially by two or more processors 1001. The processor 1001 may be mounted using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 can store a program (a program code), a software module, and the like executable for performing a method according to one embodiment of the present disclosure.

The storage 1003 is a computer-readable recording medium and, for example, may be configured by at least one of an optical disc such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above, for example, may be a database including at least one of the memory 1002 and a storage 1003, a server, or any other appropriate medium.

The communication device 1004 is hardware (a transmission/reception device) for performing inter-computer communication through at least one of a wired network and a wireless network and, for example, may be called also as a network device, a network controller, a network card, a communication module, or the like. For example, each function of the at-home prediction device 10 described above may be realized by the communication device 1004.

The input device 1005 is an input device (for example, a keyboard, a mouse, a microphone, a switch, buttons, a sensor, or the like) that accepts an input from the outside. The output device 1006 is an output device (for example, a display, a speaker, an LED lamp, or the like) that performs output to the outside. In addition, the input device 1005 and the output device 1006 may have an integrated configuration (for example, a touch panel).

In addition, devices such as the processor 1001, the memory 1002, and the like are connected using a bus 1007 for communication of information. The bus 1007 may be configured as a single bus or buses different between devices.

In addition, the at-home prediction device 10 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by the hardware. For example, the processor 1001 may be mounted using at least one of such hardware components.

The notification of information is not limited to the aspect/embodiment described in the present disclosure and may be performed using any other method.

Each aspect/embodiment described in the present disclosure may be applied to at least one of the long term evolution (LTE), the LTE-Advanced (LTE-A), the Super 3G, the IMT-Advanced, the 4th generation mobile communication system (4G), the 5th generation mobile communication system (5G), the future proportion access (FRA), the new Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), a system using another appropriate system and a next generation system extended based on these. In addition, the aspect/embodiment may be applied to a combination of a plurality of systems (for example, a combination of at least one of LTE and LTE-A and 5G or the like).

The processing sequence, the sequence, the flowchart, and the like of each aspect/embodiment described in the present disclosure may be changed in order as long as there is no contradiction. For example, in a method described in the present disclosure, elements of various steps are presented in an exemplary order, and the method is not limited to the presented specific order.

The input/output information and the like may be stored in a specific place (for example, a memory) or managed using a management table. The input/output information and the like may be overwritten, updated, or additionally written. The output information and the like may be deleted. The input information and the like may be transmitted to another device.

A judgment may be performed using a value ("0" or "1") represented by one bit, may be performed using a Boolean value (true or false), or may be performed using a comparison between numerical values (for example, a comparison with a predetermined value).

The aspects/embodiments described in the present disclosure may be individually used, used in combination, or be switched therebetween in accordance with execution. In addition, a notification of predetermined information (for example, a notification of "being X") is not limited to be performed explicitly and may be performed implicitly (for example, a notification of the predetermined information is not performed).

As above, while the present disclosure has been described in detail, it is apparent to a person skilled in the art that the present disclosure is not limited to the embodiments described in the present disclosure. The present disclosure may be performed as a modified or changed form without departing from the concept and the scope of the present disclosure set in accordance with the claims. Thus, the description presented in the present disclosure is for the purpose of exemplary description and does not have any limited meaning for the present disclosure.

It is apparent that software, regardless whether it is called software, firmware, middleware, a microcode, a hardware description language, or any other name, be widely interpreted to mean a command, a command set, a code, a code segment, a program code, a program, a subprogram, a software module, an application, a software application, a software package, a routine, a subroutine, an object, an executable file, an execution thread, an order, a function, and the like.

In addition, software, a command, information, and the like may be transmitted and received via a transmission medium. For example, in a case in which software is transmitted from a website, a server, or any other remote source using at least one of a wiring technology (such as a coaxial cable, an optical fiber cable, a twisted pair, a digital subscriber line (DSL) or the like) and a radio technology (such as infrared rays, microwaves, or the like), at least one of such a wiring technology and a radio technology is included in the definition of the transmission medium.

Information, information, a signal, and the like described in the present disclosure may be represented using any one among other various technologies. For example, data, an instruction, a command, information, a signal, a bit, a symbol, a chip, and the like described over the entire description presented above may be represented using a voltage, a current, radiowaves, a magnetic field or magnetic particles, an optical field or photons, or an arbitrary combination thereof.

In addition, a term described in the present disclosure and a term that is necessary for understanding the present disclosure may be substituted with terms having the same meaning or a meaning similar thereto.

In addition, information, a parameter, and the like described in the present disclosure may be represented using absolute values, relative values from predetermined values, or other corresponding information.

A name used for each parameter described above is not limited in any aspect. In addition, numerical equations using such parameters may be different from those that are explicitly disclosed in the present disclosure.

Terms such as "determining" used in the present disclosure may include various operations of various types. The "determining," for example, may include a case in which judging, calculating, computing, processing, deriving, investigating, looking up, search, inquiry (for example, looking up a table, a database, or any other data structure), or ascertaining is regarded as "determining" In addition, "determining" may include a case in which receiving (for example, receiving information), transmitting (for example, transmitting information), input, output, or accessing (for example, accessing data in a memory) is regarded as "determining." Furthermore, "determining" may include a case in which resolving, selecting, choosing, establishing, comparing, or the like is regarded as "determining." In other words, "determining" includes a case in which a certain operation is regarded as "determining. In addition, "determining" may be rephrased with "assuming," "expecting," "considering," or the like.

Terms such as "connected" or "coupled" or all the modifications thereof mean all the kinds of direct or indirect connection or coupling between two or more elements and may include presence of one or more intermediate elements between two elements that are mutually "connected" or "coupled. Coupling or connection between elements may be physical coupling or connection, logical coupling or connection, or a combination thereof. For example, "connection" may be rephrased with "access". When used in the present disclosure, two elements may be conceivable as being mutually "connected" or "coupled" by using at least one of one or more wires, cables, and print electric connections and, as several non-limiting and non-comprehensive examples, by using electromagnetic energy having wavelengths in a radio frequency region, a microwave region, and a light (both visible light and non-visible light) region.

Description of "on the basis of" used in the present disclosure does not mean "only on the basis of" unless otherwise mentioned. In other words, description of "on the basis of" means both "only on the basis of" and "at least on the basis of."

In a case in which "include," "including," and modifications thereof are used in the present disclosure, such terms are intended to be inclusive like a term "comprising. In addition, a term "or" used in the present disclosure is intended to be not "exclusive OR."

In the present disclosure, for example, in a case in which an article such as "a," "an," or "the" is added in English through a translation, the present disclosure may include a plural form of a noun following such an article.

In the present disclosure, an expression "A and B are different" may mean that "A and B are different from each other". In addition, the expression may mean that "A and B are different from C". Terms such as "separated," "coupled," and the like may be interpreted to be similar to being "different."

REFERENCE SIGNS LIST

10 At-home prediction device
11 Household information acquiring unit
12 Prediction information acquiring unit
13 Prediction model generating unit
14 Dimension compressing unit
15 Prediction unit
16 Output unit
1001 Processor
1002 Memory
1003 Storage
1004 Communication device
1005 Input device
1006 Output device
1007 Bus

The invention claimed is:

1. An at-home prediction device making a prediction relating to a resident in a household being at home, the at-home prediction device comprising circuitry configured to:
    acquire household information according to the number of households of each type in an area in which the household are located;
    acquire prediction information of a plurality of types other than the household information in the area that is used for the prediction relating to being at home;
    perform dimension compression on the prediction information together with the household information for each type of the prediction information;
    make prediction relating to the resident in the household being at home on the basis of information that is compressed in dimensions; and
    output information representing a prediction result.

2. The at-home prediction device according to claim 1, wherein the circuitry acquires information of any one of in-area states of mobile communication terminals held by residents of an area that is a prediction target, a watching or listening state of broadcast in the area, population compositions for each gender, each age, or each income in the area, facilities in the area, and geographical characteristics of the area as the prediction information.

3. The at-home prediction device according to claim 1, wherein the circuitry acquires information for each of households that are prediction targets and makes a prediction relating to residents being at home of the households also on the basis of the information.

4. The at-home prediction device according to claim 1, wherein the circuitry is further configured to:
generate a prediction model used for the prediction by acquiring machine learning information corresponding to the household information and the prediction information, performing dimension compression of machine learning information corresponding to the prediction information for each type together with machine learning information corresponding to the household information, generating a rule of the dimension compression, and performing machine learning on the basis of the dimension-compressed machine learning information,
wherein the circuitry performs dimension compression on the basis of the rule of the dimension compression.

5. The at-home prediction device according to claim 2, wherein the circuitry acquires information for each of households that are prediction targets and makes a prediction relating to residents being at home of the households also on the basis of the information.

* * * * *